C. F. BROWN.
STRAINER.
APPLICATION FILED DEC. 20, 1913.
1,116,234.
Patented Nov. 3, 1914.
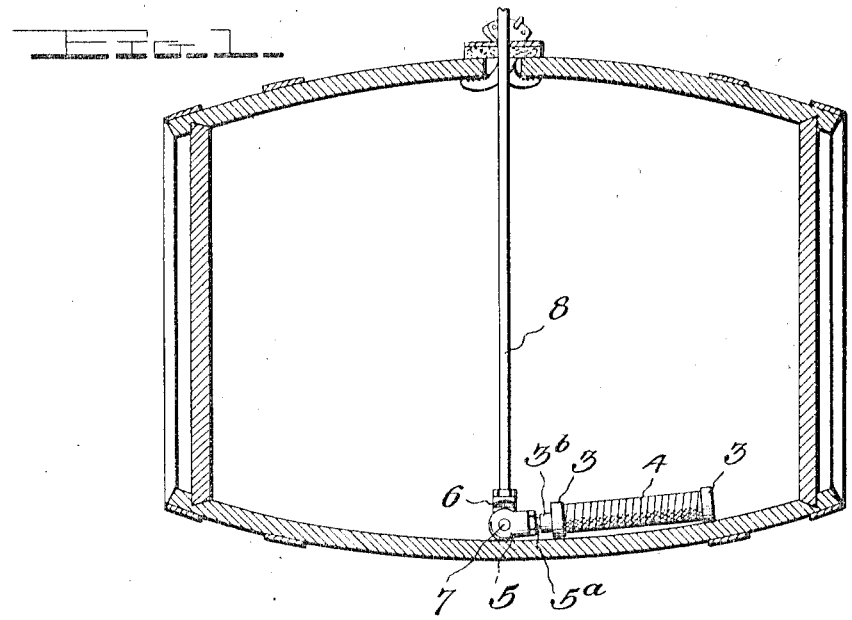
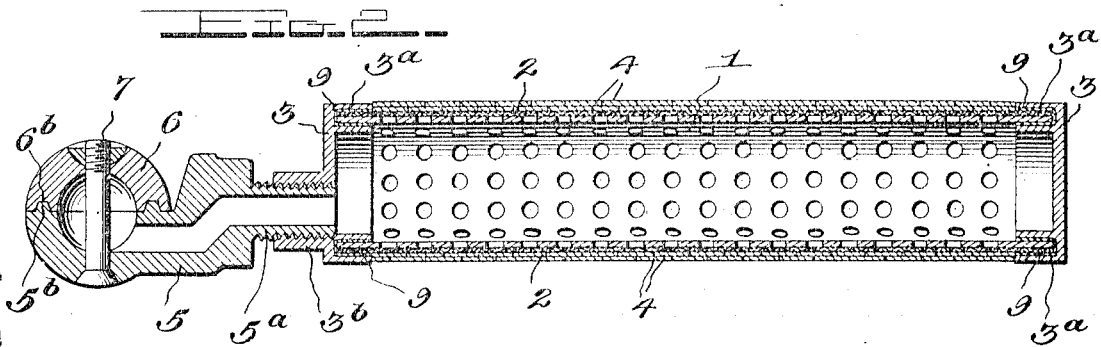
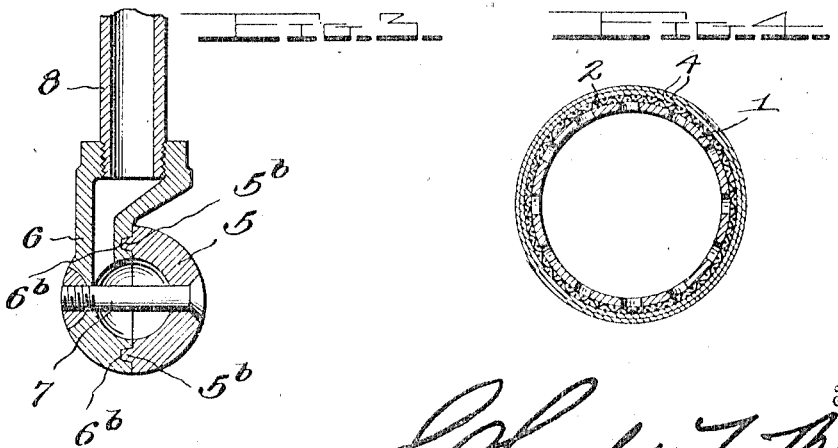

UNITED STATES PATENT OFFICE.

CHARLES F. BROWN, OF NEW YORK, N. Y., ASSIGNOR TO UNIVERSAL LIQUID REGISTER COMPANY, OF NEW YORK, N. Y., A CORPORATION OF NEW YORK.

STRAINER.

1,116,234.  Specification of Letters Patent.  Patented Nov. 3, 1914.

Application filed December 20, 1913. Serial No. 807,913.

*To all whom it may concern:*

Be it known that I, CHARLES F. BROWN, a citizen of the United States, residing at New York, in the county of New York and State of New York, have invented certain new and useful Improvements in Strainers; and I hereby declare that the following is a full, clear, and exact description thereof, reference being had to the accompanying drawings, which form part of this specification.

This invention is a novel strainer for liquids, and its objects are to provide a strainer which will exclude all foreign matters from the liquid being withdrawn from the tank and render the same in a perfectly clear condition, and to provide a strainer which can be readily inserted in and removed from barrels or other containers that have small filling openings.

In the accompanying drawings I have illustrated a strainer in which the said objects are realized, and I will explain the invention in detail with reference thereto, and set forth in the claims the features and combination of parts for which protection is desired.

In said drawings:—Figure 1 is a view of the strainer as in position for use in a barrel. Fig. 2 is an enlarged longitudinal section through such strainer. Fig. 3 is an enlarged sectional view of the joint. Fig. 4 is an enlarged transverse sectional view of the strainer.

The strainer body comprises a perforated tube 1 made of non-corrodible material, preferably brass, of approximately the length and diameter desired for the strainer. This tube forms a substantial body and support for the outer screening portions of the strainer.

Closely surrounding this tube 1 is a screen 2 of very fine woven wire mesh; being preferably made of tinned wire having about 1,400 meshes to the square inch. This screen 2 is wrapped around the tube and is connected at the joints so that no foreign matters can pass through the joints. The ends of the tube 1 and its inclosing screen 2 are inserted in annular recesses 3ª in caps 3, which are preferably formed of non-corrodible metal, and the tube screen and caps are firmly and closely united, preferably by dipping the joints in melted tin, as indicated at 9, in Fig. 2, and which fills the grooves 3ª and securely unites the cap, screen and tube together. Each end cap is secured to the ends of both the tube and screen in this manner.

One of the end caps is provided with an opening communicating with a nipple 3ᵇ which is connected to a pipe through which liquid may be withdrawn from the interior of the screen.

After the caps are attached to the tube and screen as described, all the exposed portions of the screen are covered with a closely woven fabric. I preferably use cotton tape, wrapped around the parts, as indicated at 4 in the drawings; such wrapping further sub-divides the area of the openings in the screen 2. A strainer thus made will practically separate all floating or suspended foreign matters from the liquid passed therethrough.

As shown, the nipple 3ᵇ of the screen is attached to the nipple 5ª of a coupling member 5 which is connected to a corresponding member 6. The opposed portions of these members 5 and 6 are preferably semi-spherical, and they are united together by means of an axially disposed bolt or screw 7; and the opposed meeting faces of these members 5 and 6 are respectively provided with an annular flange and groove, as indicated at 5ᵇ and 6ᵇ in Figs. 2 and 3, so that a perfectly water-tight joint is made between said members. It will be observed that this construction allows the part 5 to turn relative to the part 6, the bolt 7 acting as a pivot.

The part 6 of the coupling is connected to a pipe 8, of any desired length, which is long enough to enable the strainer to be inserted through the bung-hole of a barrel and then turned to horizontal position, as shown in Fig. 1. The strainer can be inserted endwise through the bung-hole in the barrel, and can then lie flat upon the lower side of the barrel.

The pipe 8 can be connected to any suitable pump or suction device, and when suction is applied clear liquid can be drawn through the strainer, and all sediment and foreign matters, such as powdered charcoal and the like, will be separated from the liquid drawn through such strainer and the liquid withdrawn from the barrel clear and free from any suspended matters.

I claim:

1. A strainer for the purpose specified comprising an interior perforated supporting tube, an exterior screen formed of finely woven wire mesh wrapped around said supporting tube, and caps closing the end of the strainer and having annular channels receiving the ends of the tube and screen, and a soft metal filling in said channels, substantially as described.

2. A tubular strainer for the purpose specified comprising an interior perforated tube, an exterior woven wire mesh screen wrapped around said tube, and circular cap pieces provided with annular grooves into which the ends of the tube and sieve are inserted, and a tin filling within the grooves and uniting the parts, one of said caps having a nipple for attachment to a pipe substantially as described.

In testimony that I claim the foregoing as my own, I affix my signature in presence of two witnesses.

CHARLES F. BROWN.

Witnesses:
J. E. NEIKIRK,
A. D. DICKERSON.